US012536226B2

(12) United States Patent
Santoso et al.

(10) Patent No.: US 12,536,226 B2
(45) Date of Patent: Jan. 27, 2026

(54) SYSTEMS, METHODS, AND APPARATUS FOR CORRELATING LOCATIONS OF REAL-WORLD OBJECTS TO THE DIGITAL WORLD

(71) Applicant: The Boeing Company, Arlington, VA (US)

(72) Inventors: Robert Santoso, Arlington, VA (US); Andrew Born, Arlington, VA (US); Michael Goodrow, Arlington, VA (US)

(73) Assignee: The Boeing Company, Arlington, VA (US)

( * ) Notice: Subject to any disclaimer, the term of this patent is extended or adjusted under 35 U.S.C. 154(b) by 146 days.

(21) Appl. No.: 18/538,871

(22) Filed: Dec. 13, 2023

(65) Prior Publication Data

US 2025/0200107 A1 Jun. 19, 2025

(51) Int. Cl.
*G06F 16/587* (2019.01)
*G06F 3/01* (2006.01)
*G06T 7/73* (2017.01)
*G06T 19/00* (2011.01)

(52) U.S. Cl.
CPC ............ *G06F 16/587* (2019.01); *G06F 3/012* (2013.01); *G06T 7/73* (2017.01); *G06T 19/006* (2013.01)

(58) Field of Classification Search
CPC ......... G06F 16/587; G06F 3/012; G06T 7/73; G06T 19/006; G01S 17/89; G06V 10/25; G06V 10/22; G06Q 10/20
See application file for complete search history.

(56) References Cited

U.S. PATENT DOCUMENTS

2020/0151450 A1\* 5/2020 Hishinuma ............... G06T 7/50
2021/0241532 A1 8/2021 Daniels et al.
2024/0371138 A1\* 11/2024 Keegan ................. G06N 20/00

FOREIGN PATENT DOCUMENTS

| CA | 3040770 A1 | 8/2018 |
| EP | 2096463 A2 | 9/2009 |
| WO | 2009152567 A1 | 12/2009 |

OTHER PUBLICATIONS

Extended European Search Report for European Application No. EP242164655 dated Apr. 15, 2025, 9 pages.

\* cited by examiner

*Primary Examiner* — Jeffery A Brier
(74) *Attorney, Agent, or Firm* — Harrity & Harrity, LLP

(57) ABSTRACT

A portable electronic device for obtaining information about an area of interest of an object is disclosed. The portable electronic device may include a display, an image capture device, a measurement device, and a processor. The processor may be configured to determine one or more positions of a portable electronic device relative to a location of one or more items of the object and determine a location of the area of interest of the object relative to the one or more positions of the portable electronic device. The processor may also be configured to identify electronic or digital information associated with the location of the area of interest of the object and send the electronic or digital information or the location of the area of interest to a remote computing device.

20 Claims, 8 Drawing Sheets

SYSTEMS, METHODS, AND APPARATUS FOR CORRELATING LOCATIONS OF REAL-WORLD OBJECTS TO THE DIGITAL WORLD

FIELD

The present disclosure relates generally to data processing systems and, more particularly, to systems and methods for determining locations of areas of interest of a physical object (e.g., a vehicle) in a real-world environment and obtaining electronic or digital information (e.g., digital models, virtual representations, schematics, etc.) related to the areas of interest of the physical object.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Many complex objects and structures, such as large transport aircraft, are composed of multiple elements and systems, and each system may contain a significant number of components and/or parts. These complex objects are frequently inspected by on-site support personnel (e.g., maintenance personnel, inspectors, etc.) in order to maintain the objects and to repair defects (e.g., damages, faults, etc.) of the objects. In order to analyze areas of the object, it may be desirable to determine location and measurement information of the defects of the object and obtain information (e.g., schematics, drawings, maintenance records, etc.) related to the defects. However, obtaining information relating to defects of large complex objects can be a laborious task. For example, support personnel may need to obtain and review numerous technical manuals and documents to find the appropriate information for troubleshooting and repairing the defects of objects.

In some situations, on-site support personnel may communicate with on-site and/or off-site analysts or experts (e.g., service engineers, maintenance engineers, etc.) regarding the defects of an object (e.g., a vehicle). Typically, the on-site support personnel may use a camera to take photos of the defects (e.g., damage) of the object as well as document the position of the defects from the location of the on-site support personnel. For example, maintenance personnel may take a photo of the damage to a vehicle (e.g., aircraft), document the location of the damage, and create a damage report by sketching a drawing of the area of the damage on the vehicle. FIG. 1 shows a photo for a lightning strike report indicating the location of the damage location relative to known items and locations on a skin or an aircraft. The on-site support personnel may provide the photos of the damage, the damage report, and details of the location of the damage to the on-site and off-site analysts. The on-site and/or offsite analysts (e.g., structural engineers) may use the information to perform a structural analysis, conduct an engineering substantiation, complete a conformity inspection record, and/or submit the record to Federal Aviation Administration (FAA) for review.

After the location information, the photos, and the damage report is received, the on-site and/or off-site analysts may attempt to determine the location of the damage to the object by visually comparing the photos to available documentation (e.g., drawings, technical manuals, etc.). However, determining an accurate location of the damage may be difficult in areas where few uniquely identifiable landmark features exist. Further, the on-site and off-site analysts may only be able to obtain a subjective indication of the location of the damage to the object. As a result, an evaluation or analysis of the damage may be conducted with a high probability of location error. In addition, human analysis of a large number of defects (e.g., damage) may likely be error prone.

Further, the photos or images taken by the camera of the support personnel and sent to on-site and/or off-site analysts may contain embedded metadata, such as GPS location data and camera setting information. The embedded metadata from the images may be used by the onsite and/or off-site analysts to estimate the location of the camera relative to the object. However, without additional context about the location (i.e., position and orientation) of the object relative to the frame of reference of the camera, the metadata may not be sufficient to determine the location of the camera relative to the object. Further, since the location of the camera relative to the object may not be accurately determined, identifying the location of the defect of the object using the images can be difficult.

It may also be difficult for onsite and/or offsite analysts to obtain accurate measurements of the locations of the defects of the object from photos or images. Often, an item of known dimensions (e.g., a tape measure) is inserted in the image to provide an analyst a size reference. However, even with a reference scale, it can be difficult using images to locate and determine a precise position of the defect of the object in a coordinate system of the object. For at least these reasons, it would be advantageous to develop systems and methods capable of determining locations of areas of interest (e.g., defects, damage, etc.) of a physical object in a real-world environment and obtaining electronic or digital information relevant to the areas of interest of the physical object.

SUMMARY

The present application is directed to embodiments relating to systems, methods, and apparatus for determining locations or positions of areas of interest of a physical object (e.g., a vehicle, an aircraft, a system, etc.) in a real-world environment. The embodiments may use the locations of the areas of interest to obtain electronic or digital information (e.g., 3D digital models, virtual representations, schematics, engineering drawings, etc.) related to the areas of interest of the physical object. The areas of interest may correspond to anomalies, defects, damage, faults, components, parts, objects, items, and/or conditions of the physical object.

The embodiments may be used for inspecting, troubleshooting, and/or repairing physical objects. For example, the embodiments may be used by support personnel to perform maintenance and inspections of a physical object. The embodiments may quickly and accurately determine physical locations or positions of areas of interest relative to the physical object. For example, the embodiments may determine coordinates of the areas of interest (e.g., anomalies, defects, damage, etc.) of a physical object in a coordinate system of the object (e.g., object centric coordinate system). In some examples, the embodiments may calculate a physical location of an object of interest on or in a vehicle, such as an aircraft. As a result, the potential for human error in accurately determining the locations of the areas of interest of the physical object may be reduced.

The embodiments may convert the physical locations of the areas of interest of the physical object to positions in an object coordinate system (e.g., vehicle-centric coordinate system). The embodiments may obtain electronic or digital information about the areas of interest of the physical object based on the locations of the areas of interest in the object coordinate system. For example, the embodiments may use the locations of the areas of interest of the physical object in an object coordinate system to identify and retrieve electronic information and records related to the areas of interest of the physical object (e.g., vehicle, aircraft, etc.). The electronic information may be organized or categorized using the object coordinate system (e.g., vehicle coordinate system) and may include CAD/CAM electronic records, 3D digital models, virtual representations, schematics, engineering drawings, technical documentation, maintenance reports, trouble reports, service bulletins, system reports, structure analysis, operational documents, and other information related to the areas of interest of the physical object.

The embodiments may be configured to search electronic or digital records and reports (e.g., damage report records, service requests, etc.) in one or more databases for information relating to the areas of interest of the physical object. For example, the embodiments may search electronic reports and records for problems related to the location of the damage for a particular type of vehicle or aircraft. The embodiments may identify and display the relevant electronic or digital records to support or maintenance personnel. The embodiments may also store or log any current damage reports of the physical object in a database as a new record or report. For example, the embodiments may create and store a service request or problem report, including the description and type of damage, object or vehicle type, photos and sketches of the damage, etc., in a database (e.g., airline database) based on the physical location of the damage.

The embodiments may send the retrieved electronic and digital reports and records relating to the areas of interest of the physical object to devices of onsite and off-site analysts or experts. For example, the embodiments may send graphical and virtual representations of the areas of interest of the physical object (e.g., a virtual representation of an aircraft cockpit) to on-site and/or off-site analysts. The electronic and digital information may assist the on-site and offsite analysts in analyzing the areas of interest of the physical object. For example, the embodiments may enable on-site and off-site analysts to view the electronic or digital information related to the areas of interest of the physical object. As a result, the on-site and off-site analysts may not need to visit and inspect the physical object and may remotely determine repairs for any defects (e.g., anomalies, damage, conditions, etc.) associated with the areas of interest.

By enabling efficient and reliable determinations of areas of interest of a physical object (e.g., a vehicle, a system, etc.) in a real-world environment, the embodiments may improve the process for troubleshooting and repairing the physical object. For example, the embodiments may decrease the time required to identify and repair defects of the physical object (e.g., defects, damage, cracks, conditions, faults, etc.) and to reduce the time necessary to obtain electronic and digital information relating to the defects. The embodiment may also automate and speed-up the process for repairing the physical object (e.g., a vehicle), increase the accuracy of locating defects, reduce errors in determining locations of the defects, and create new records to benefit future repairs. Further, the embodiments may advantageously increase reliability, safety, maintainability, and availability of the physical object (e.g., a vehicle) resulting in improved performance and operational capabilities of the physical object.

Additionally, in the aircraft industry, the embodiments may reduce the number of flights that are delayed or cancelled for maintenance or repair issues.

In one aspect, a portable electronic device for obtaining information about an area of interest of an object is disclosed. The portable electronic device may include a display, an image capture device, a measurement device, and a processor. The processor may be configured to determine one or more positions of a portable electronic device relative to a location of one or more items of the object and determine a location of the area of interest of the object relative to the one or more positions of the portable electronic device. The processor may also be configured to identify electronic or digital information associated with the location of the area of interest of the object and send the electronic or digital information or the location of the area of interest to a remote computing device In another aspect, a method for obtaining information about an area of interest of an object is disclosed. The method may comprise determining one or more positions of a portable electronic device relative to a location of one or more items of the object and determining a location of the area of interest of the object relative to the one or more positions of the portable electronic device. The method may also comprise identifying electronic or digital information associated with the location of the area of interest of the object and sending the electronic or digital information or the location of the area of interest to a remote computing device.

In still another aspect, a non-transitory computer-readable medium storing instructions is disclosed that, when the instructions are executed by one or more processors, causes the one or more processors to perform operations for obtaining information about an area of interest of an object. The operations may comprise determining one or more positions of a portable electronic device relative to a location of one or more items of the object and determining a location of the area of interest of the object relative to the one or more positions of the portable electronic device. The operations may also comprise identifying electronic or digital information associated with the location of the area of interest of the object and sending the electronic or digital information or the location of the area of interest to a remote computing device.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
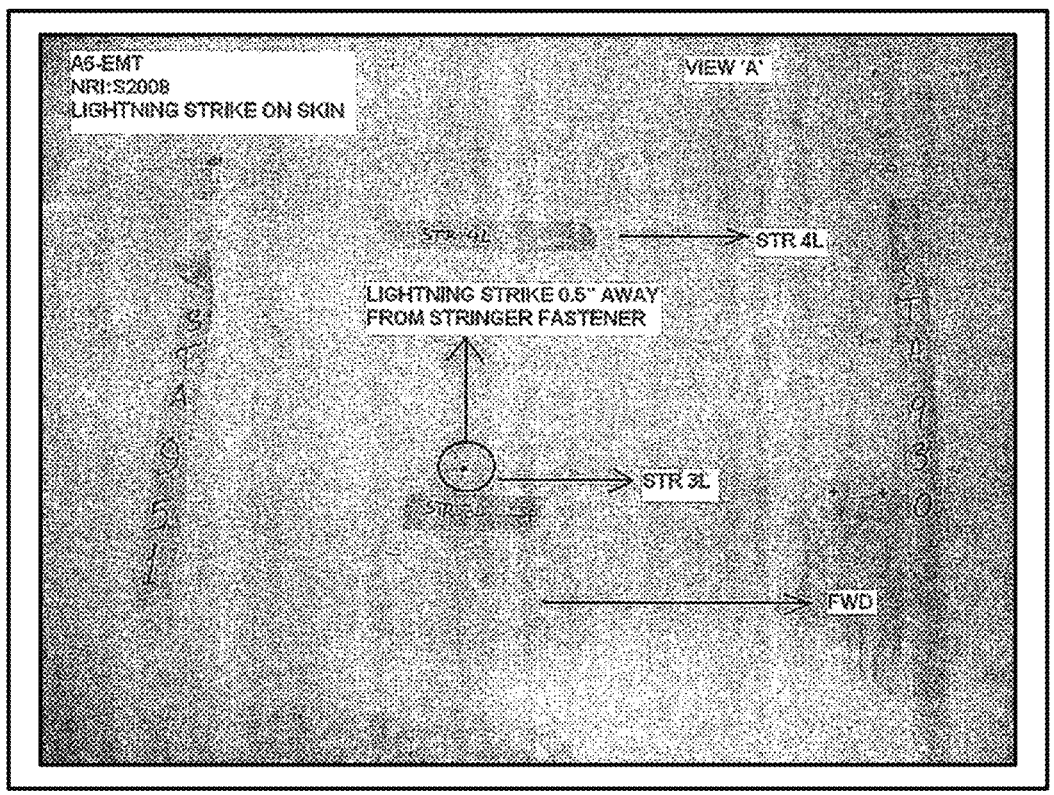
FIG. 1 shows a photo for an aircraft damage report detailing the location of the damage relative to other portions of the aircraft.

The figures and the following description illustrate specific exemplary embodiments. It will be appreciated that those skilled in the art will be able to devise various arrangements that, although not explicitly shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular embodiments are described herein with reference to the drawings. In the description, common features are designated by common reference numbers throughout the drawings. In some drawings, multiple instances of a particular type of feature may be used. Although these features are physically and/or logically distinct, the same reference number may be used for each, and the different instances are distinguished by addition of a letter to the reference number.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

The present application is directed to embodiments relating to systems, methods, and apparatus for determining locations or positions of areas of interest of a physical object (e.g., a vehicle, an aircraft, a system, etc.) in a real-world environment. The embodiments may use the locations of the areas of interest to obtain electronic or digital information (e.g., 3D digital models, virtual representations, schematics, engineering drawings, etc.) related to the areas of interest of the physical object. The areas of interest may correspond to anomalies, defects, damage, faults, components, parts, objects, items, and/or conditions of the physical object.

The embodiments may be used for inspecting, troubleshooting, and/or repairing physical objects. For example, the embodiments may be used by support personnel to perform maintenance and inspections of a physical object. The embodiments may quickly and accurately determine physical locations or positions of areas of interest relative to the physical object. For example, the embodiments may determine coordinates of the areas of interest (e.g., anomalies, defects, damage, etc.) of a physical object in a coordinate system of the object (e.g., object centric coordinate system). In some examples, the embodiments may calculate a physical location of an object of interest on or in a vehicle, such as an aircraft. As a result, the potential for human error in accurately determining the locations of the areas of interest of the physical object may be reduced.

The embodiments may convert the physical locations of the areas of interest of the physical object to positions in an object coordinate system (e.g., vehicle-centric coordinate system). The embodiments may obtain electronic or digital information about the areas of interest of the physical object based on the locations of the area of interest in the object coordinate system. For example, the embodiments may use the locations of the areas of interest of the physical object in an object coordinate system to identify and retrieve electronic information and records related to the areas of interest of the physical object (e.g., vehicle, aircraft, etc.). The electronic information may be organized or categorized using the object coordinate system (e.g., vehicle coordinate system) and may include CAD/CAM electronic records, 3D digital models, virtual representations, schematics, engineering drawings, technical documentation, maintenance reports, trouble reports, service bulletins, system reports, structure analysis, operational documents, and other information related to the areas of interest of the physical object.

The embodiments may be configured to search electronic or digital records and reports (e.g., damage report records, service requests, etc.) in one or more databases for information relating to the areas of interest of the physical object. For example, the embodiments may search electronic reports and records for problems related to the location of the damage for a particular type of vehicle or aircraft. The embodiments may identify and display the relevant electronic or digital records to support or maintenance personnel. The embodiments may also store or log any current damage reports of the physical object in a database as a new record or report. For example, the embodiments may create and store a service request or problem report, including the description and type of damage, object or vehicle type, photos and sketches of the damage, etc., in a database (e.g., airline database) based on the physical location of the damage The embodiments may send the retrieved electronic and digital reports and records relating to the areas of interest of the physical object to devices of onsite and off-site analysts or experts. For example, the embodiments may send graphical and virtual representations of the areas of interest of the physical object (e.g., a virtual representation of an aircraft cockpit) to on-site and/or off-site analysts. The electronic and digital information may assist the on-site and offsite analysts in analyzing the areas of interest of the physical object. For example, the embodiments may enable on-site and off-site analysts to view the electronic or digital information related to the areas of interest of the physical object. As a result, the on-site and off-site analysts may not need to visit and inspect the physical object and may remotely determine repairs for any defects (e.g., anomalies, damage, conditions, etc.) associated with the areas of interest.

By enabling efficient and reliable determinations of areas of interest of a physical object (e.g., a vehicle, a system, etc.) in a real-world environment, the embodiments may improve the process for troubleshooting and repairing the physical object. For example, the embodiments may decrease the time required to identify and repair defects of the physical object (e.g., defects, damage, cracks, conditions, faults, etc.) and to reduce the time necessary to obtain electronic and digital information relating to the defects. The embodiment may also automate and speed-up the process for repairing the physical object (e.g., a vehicle), increase the accuracy of locating defects, reduce errors in determining locations of the defects, and create new records to benefit future repairs. Further, the embodiments may advantageously increase reliability, safety, maintainability, and availability of the physical object (e.g., a vehicle) resulting in improved performance and operational capabilities of the physical object. Additionally, in the aircraft industry, the embodiments may reduce the number of flights that are delayed or cancelled for maintenance or repair issues.

Figure 2:
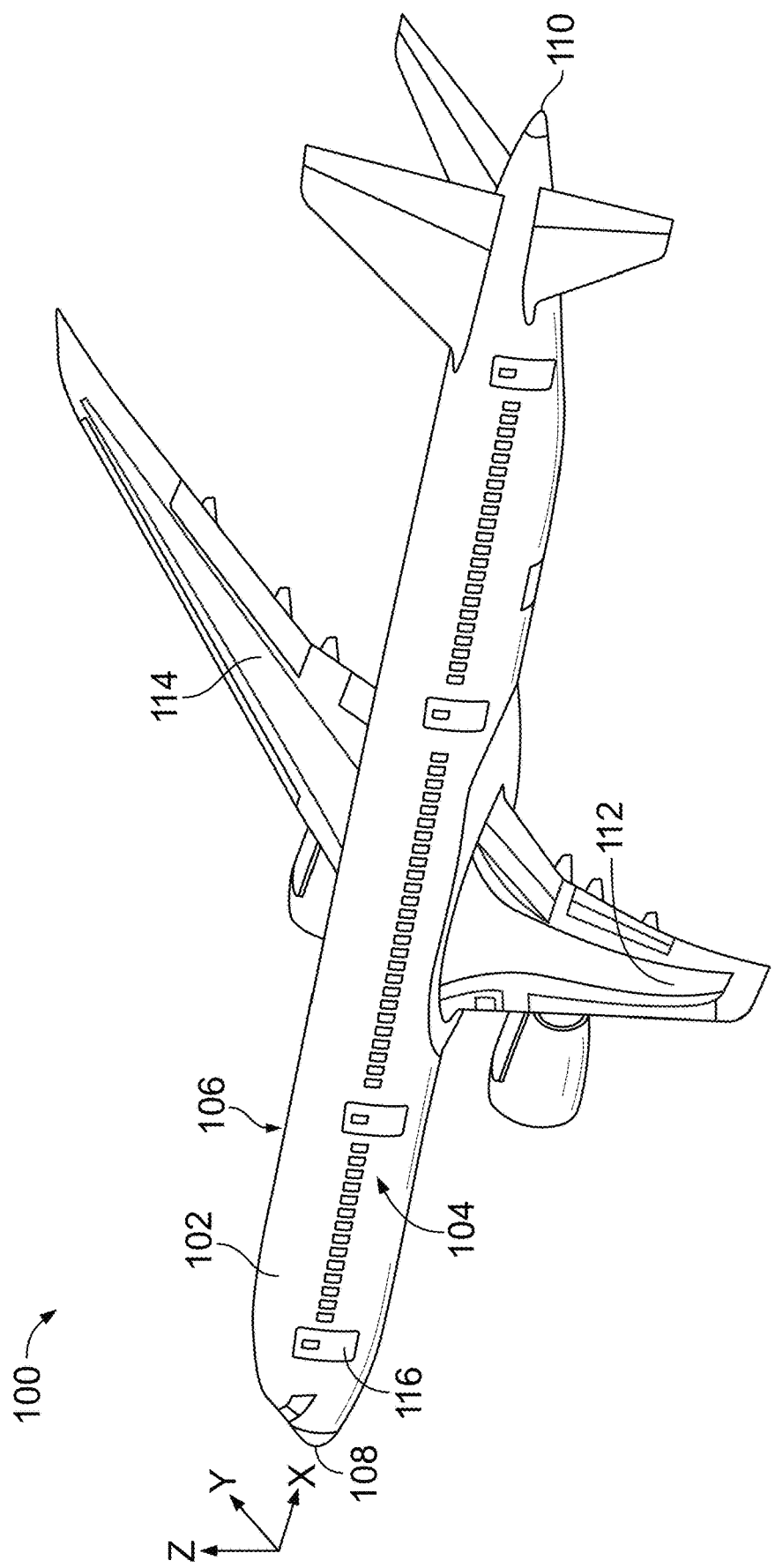
FIG. 2 is an illustration of an exemplary aircraft.

As shown in FIG. 2, an example embodiment of an aircraft 100 is illustrated in which embodiments of systems and methods for obtaining electronic or digital information (e.g., 3D digital models, schematics, drawings, etc.) related to areas of interest of a physical object, such as the aircraft 100, can be implemented. As shown in FIG. 2, the aircraft 100 includes a fuselage 102 having a left side 104, a right side 106, a nose end 108 and a tail end 110. A first wing 112 is coupled to the left side 104 of the fuselage 102. A second wing 114 is coupled to the right side 106 of the fuselage 102. In the illustrated example, the aircraft 100 includes a door 116 disposed on the left side 104 of the fuselage 102. Passengers and/or crew may enter (e.g., board) and/or exit (e.g., disembark) the aircraft 100 via the door 116. The aircraft 100 of FIG. 2 is merely an example and, thus, the embodiments disclosed herein may be used with other aircrafts or vehicles without departing from the scope of this disclosure.

The locations or positions of the structures and systems of the aircraft 100 may be specified with respect to local coordinates of the aircraft 100. The coordinate system for the aircraft 100 is indicated in FIG. 2, with the x-axis indicating the fore-aft direction (e.g., front to rear of aircraft 100), the y-axis indicating the port-starboard direction (e.g., left and right of the center of the aircraft 100), and the z-axis indicating the up-down direction (e.g., bottom to top of aircraft 100). The x, y, and z coordinates with respect to the aircraft 100 may also be called the station (or fuselage station), the butt line, and the water line, respectively.

Figure 3:
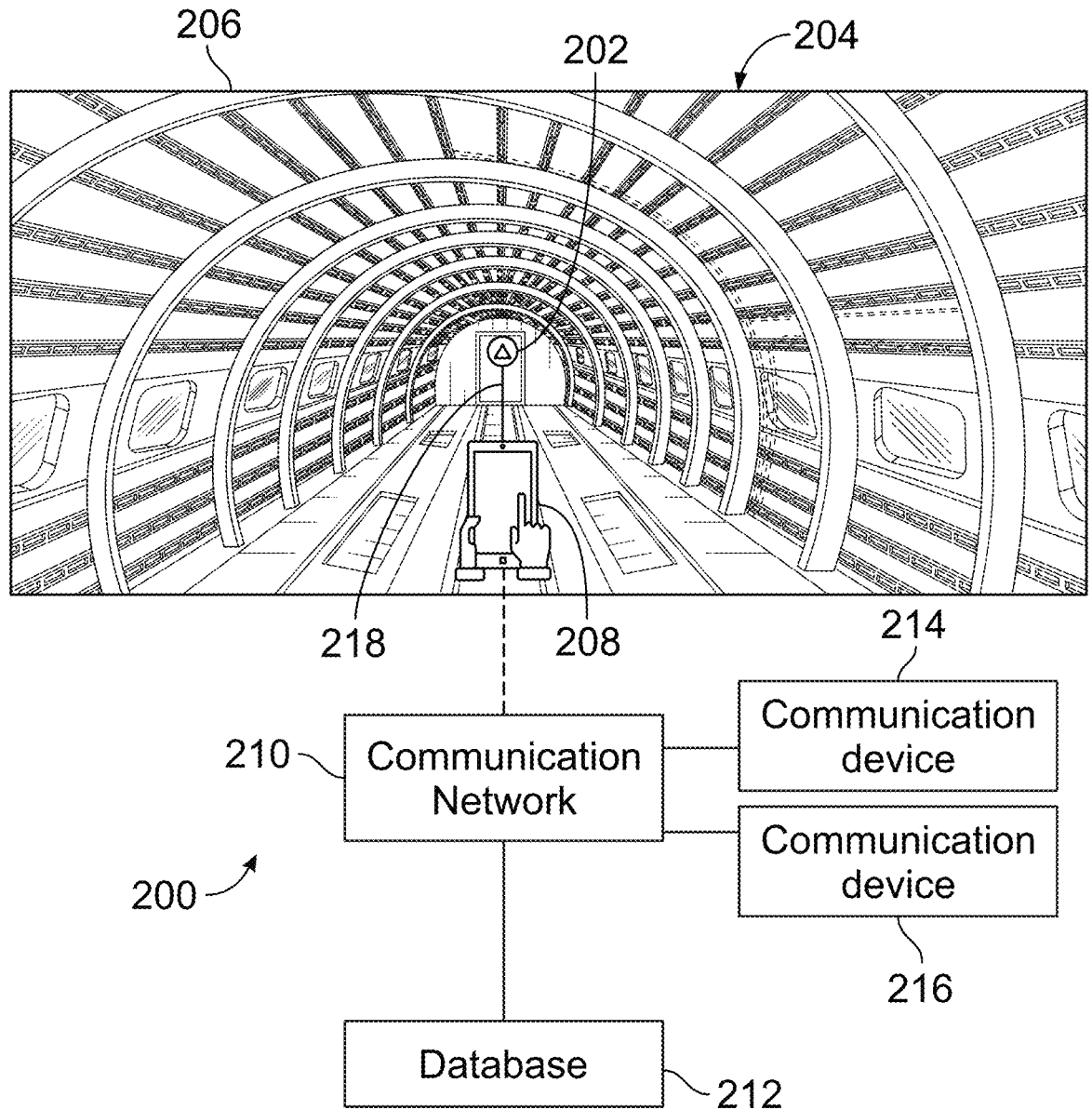
FIG. 3 is a schematic illustration of a system for obtaining information related to areas of interest of a physical object.

FIG. 3 illustrates of a system 200 for obtaining electronic or digital information about an area of interest 202 of a physical object 204 in a real-world environment 206, according to an exemplary embodiment. As shown in FIG. 3, the system 200 includes a portable electronic device 208, a communication network 210, a database 212, and communication devices 214 and 216. As illustrated, the portable electronic device 208 is in communication with the communication network 210. The communication network 210 of the system 200 may be used to provide communications links between various devices and computers connected together within the system 200. The communication network 210 may include connections, such as wires, wireless communication links, or fiber optic cables.

The portable electronic device 208 of the system 200 may be configured to display a live view of the physical object 204 in the real-world environment 206 (or a portion thereof) such that a user may view a representation of the physical object 204 in real time. The portable electronic device 208 may also be configured to determine a position or location of the area of interest 202 of the physical object 204 in the real-world environment 206, such as a location of an anomaly (e.g., a defect, a fault, a condition, damage, etc.) of the aircraft 100 of FIG. 2. Further, the portable electronic device 208 may be configured to obtain electronic or digital information (e.g., 3D digital models, virtual representations, technical documentation, schematics, maintenance reports, system data, photographic records, silhouette imagery, etc.) related to the area of interest 202 of the physical object 204.

The physical object 204 of the system 200 may include a vehicle, a building, a structure, a system, a subsystem, a power plant, a ship, a spacecraft, a surface or skin of a vehicle, a component, a part, and/or any other suitable physical object or article in the real-world environment 206. The real-world environment 206 may be any type of environment in the physical world, such as a workspace. In the illustrated example, the real-world environment 206 may be within the physical object 204, such as a fuselage of the aircraft 100 of FIG. 2. In other examples, the real-world environment 206 may be, without limitation, a maintenance environment, a manufacturing environment, a production environment, a design environment, an installation environment, and/or any other suitable environment.

As show in FIG. 3, the communication devices 214 and 216 of the system 200 may be connected to the communication network 210. The communication devices 214 and 216 may be, for example, wireless or computing devices operated by various personnel, such as maintenance personnel, mechanics, technicians, analysts, engineers, etc. The communication devices 214 and 216 may be located within the physical object 204 (e.g., inside an aircraft) or located at facilities remote from the physical object 204 (e.g. maintenance facilities).

The database 212 of the system 200 may be connected to the communication network 210. The database 212 may store information relating to the physical object 204. For example, the database 212 may include electronic or digital information (e.g., 3D digital models, virtual representations, schematics, specifications, designs, photographic records, silhouette imagery, etc.) about the architecture and structure of the physical object 204. The electronic or digital information may also include maintenance information (e.g., maintenance actions and messages, component installations and removals, etc.) about the physical object 204. Further, the electronic or digital information may include information about systems, subsystems, components, parts, etc. of the physical object 204. The electronic or digital information stored in the database 212 may be accessed and/or retrieved based on a coordinate system of the object and/or the relevancy to a position or location (e.g., coordinates) of the physical object 204. The electronic or digital information stored in the database 212 may also contain information in a graph database format, which stores data as nodes (entities) and relationships between them. These relationships are represented as edges, which can have various properties.

The portable electronic device 208 of the system 200 may be configured to capture physical or sensor data about the physical object 204 and determine geo-centric locational data (e.g., GPS location information) as well as the object-centric relative locational data (e.g., aircraft-centric) of the portable electronic device 208 within the real-world environment 206. Based on the sensor data and/or the locational data, the portable electronic device 208 may be configured to determine a location of the portable electronic device 208 in the real-world environment and relative to the physical object 204. The portable electronic device 208 may also be configured to measure a distance or range from the portable electronic device 208 to the area of interest 202 (e.g., an anomaly, a defect, a fault, a component, a part, damage, a condition, etc.) of the physical object 204. In some examples, the portable electronic device 208 may use a measurement device to project a laser or light beam 218 onto the physical object to illuminate the area of interest 202 of the physical object 204.

Once the portable electronic device 208 determines a distance to the area of interest 202 of the physical object 204, the portable electronic device 208 may determine the location or position of the area of interest 202 of the physical object 204 in a physical coordinate system. For example, the portable electronic device 208 may determine coordinates of the area of interest 202 in a physical coordinate system of the real-world environment or the portable electronic device 208. The portable electronic device 208 may convert the location of the area of interest 202 in the physical coordinate system into a position in a coordinate system of the physical object (e.g., aircraft 100 of FIG. 2) as further described below. For example, the portable electronic device 208 may translate or transform the location of the area of interest 202 of the physical object 204 in the physical coordinate system to a corresponding position in a coordinate system of the physical object (e.g., a virtual coordinate system of a digital model of the physical object 204).

After the location of the area of interest 202 of the physical object 204 is determined in the coordinate system of the object, the portable electronic device 208 may identify and obtain electronic or digital information (e.g., digital models, virtual representations, schematics, maintenance reports, specifications, designs, installation diagrams, digital twins, etc.) associated with or related to the area of interest 202 of the physical object 204. The portable electronic device 208 may retrieve the electronic or digital information from the database 212 of the system 200 or from the memory of the portable electronic device 208. To obtain the electronic or digital information, the portable electronic device 208 may generate a query based on the location of the area of interest 202 of the physical object 204 in the coordinate system of the object. The portable electronic device 208 may use the query to retrieve the electronic or digital information from the database 212 and/or the memory of the portable electronic device 208. For example, the portable electronic device 208 may retrieve electronic or digital information that matches or relates to the area of interest 202 of the physical object 204. In some examples, the portable electronic device 208 may retrieve a 3-D digital model of the physical object (e.g., a digital model of an aircraft) or a 3-D model that corresponds to the area of interest of physical object (e.g., a digital model of a structure, system or component of an aircraft).

The portable electronic device 208 may display the electronic or digital information (e.g., virtual representations, schematics, specifications, etc.) obtained from memory or the database 212 and/or send the electronic or digital information to other communication devices, such as the communication devices 214 and 216. For example, the portable electronic device 208 may display a virtual representation of the area of interest 202 of the physical object 204 and send the virtual representation to the communication devices 214 and 216. The communication devices 214 and 216 may be configured to display the electronic or digital information received from the portable electronic device 208. In some examples, the portable electronic device 208 may send the location of the area of interest 202 of the physical object 204 in the coordinate system of the object to the communication devices 214 and 216. The communication devices 214 and 216 may use the location of the area of interest 202 to access the electronic or digital information from the database 212 or local memory. For example, on-site and/or off-site analysts may use the communication devices 214 and 216 to access and retrieve electronic or digital information from the database 212 based on the position or location of the area of interest 202 of the physical object 204 in the coordinate system of the object.

Figure 4A:
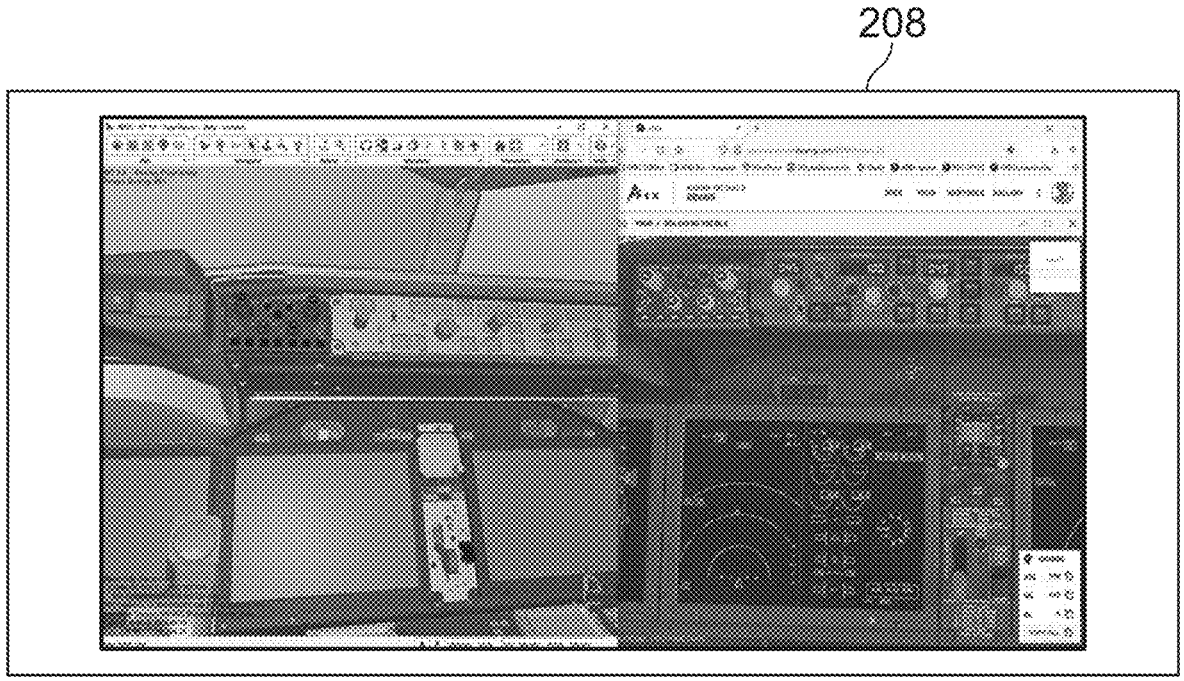
FIG. 4A is a front view of a portable electronic device of the system of FIG. 2 illustrating an image and a digital representation of a portion of a cockpit of an aircraft.
Figure 4B:
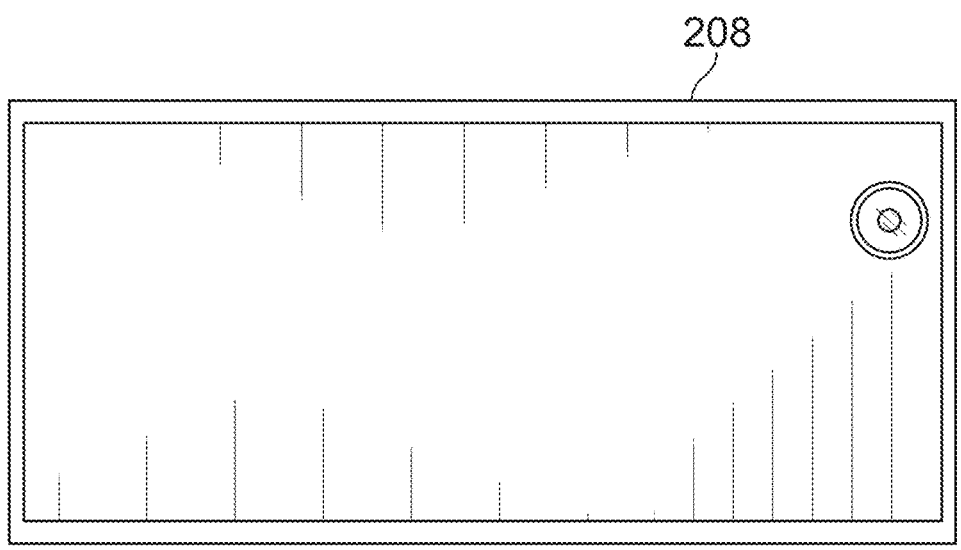
FIG. 4B is a rear view of the portable electronic device of FIG. 3.

As showing in FIGS. 4A and 4B, the portable electronic device 208 of the system 200 may be a compact device that may be handled or carried by a user or maintenance personnel. The portable electronic device 208 may include a smartphone, tablet computer, laptop computer, or any other suitable device. As shown in FIG. 4A, the portable electronic device 208 may display an image of the area of interest of the physical object along with graphic or virtual representations of the area of interest. The portable electronic device 208 may correlate and match-up a low fidelity digital image (based on a model) with the high fidelity digital image (based on a photographic database). For example, once the portable electronic device 208 determines a location of an area of interest or object (in both digital and physical worlds), the portable electronic device 208 may match-up a low fidelity digital image (based on a model) to a high fidelity digital image (based on a photographic database). As an example, a user or mechanic, performing an evaluation to verify that wiring is placed in the correct location, may view reality or the physical world (e.g., aircraft interior) as well as a digital photo from a database (e.g., digital world) displaying where the wires should be. In some examples, the portable electronic device 208 may include a wearable device (e.g., a pair of augmented reality glasses). For example, the wearable device may provide a live view of the real-world environment by superimposing a representation of the real-world environment on a transparent or translucent display that functions similar to eyeglass lenses, such that a user is able to view the real-world environment through the display.

Figure 5:
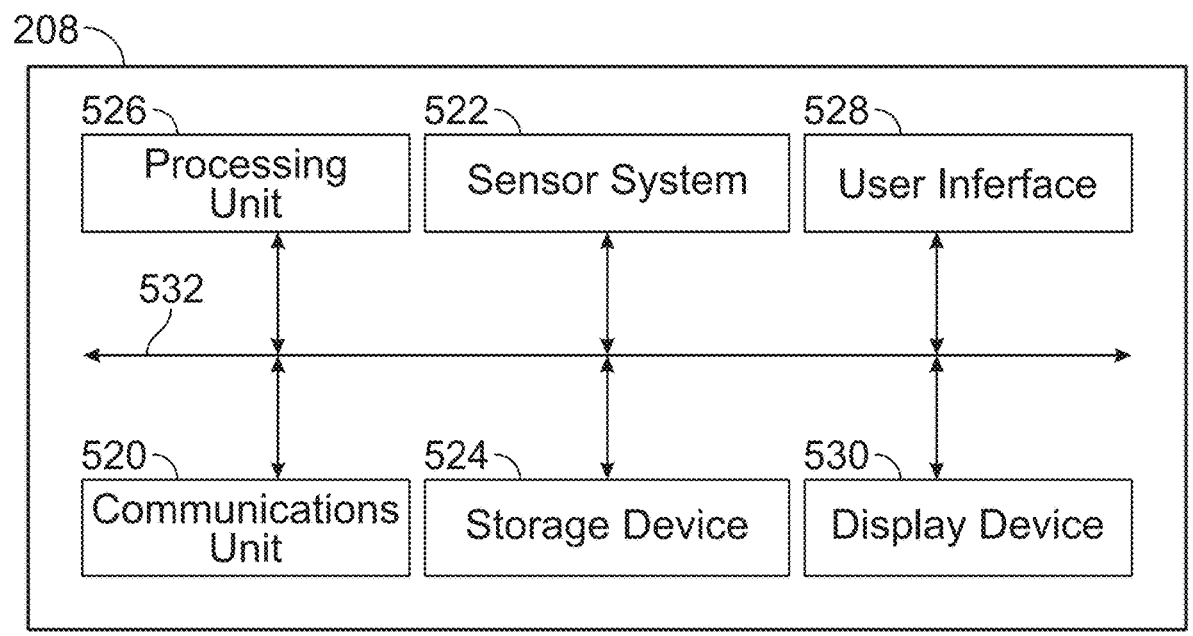
FIG. 5 is a schematic illustration of the components of the portable electronic device of FIG. 3.

Referring now to FIG. 5, a schematic illustration of the components of the portable electronic device 208 is shown. The portable electronic device 208 may include a communication unit 520, a sensor system 522, a storage device 524 (e.g., a memory or a database), a processing unit 526, a user interface 528, and a display device 530. In other examples, the portable electronic device 208 may include additional components, hardware, or functionality. A bus 532 may couple the communication unit 520, the sensor system 522, the storage device 524, the processing unit 526, the user interface 528, and the display device 530 together to enable communication there-between. Although only one bus is depicted, the portable electronic device 208 may include multiple buses or other types of communication pathways between any of its elements or components.

The communications unit 520 of the portable electronic device 208 may be configured to be connected to a communication network (e.g., the communication network 210 of FIG. 3). The communication units 520 may receive data/communications from and send data/communications to other devices, such as remote communication and/or computing devices (e.g., the communication devices 214 and 216 of FIG. 3) within the communication network. The communications unit 520 may enable the portable electronic device 208 to communicate, via a wireless channel or a wired communication link, with other devices. For example, the communications unit 520 may enable the portable electronic device 208 to wirelessly transmit a position or location of an area of interest of a physical object (e.g., the physical object 204 of FIG. 3) to other devices. The communications unit 520 may also enable the portable electronic device 208 to wirelessly transmit electronic or digital information (e.g., virtual representations, schematics, maintenance reports, drawings, component information, etc.) retrieved from the storage device 524 to other devices.

The communications unit 520 may include wireless connections, wired connections, cable connections, fiber optics connections, etc. and may communicate via a wide area network (WAN), a local area network (LAN), a cellular network, a peer-to-peer communication network, or any other suitable network. The communications unit 520 may also be operative to interface with a communications network using any type of communication protocol, such as, for example, Wi-Fi (e.g., 802.xx protocols), a radio frequency (RF) protocol (e.g., 900 MHz, 1.4 GHz, and 5.6 GHZ), Bluetooth®, a cellular communication protocol (e.g., 2G, 3G, 4G, 5G, etc.), or any other communication protocol.

The sensor system 522 of the portable electronic device 208 may be configured to capture and collect physical or sensor data (e.g., image data, ranges, distances, position information, etc.) about one or more physical objects in a real-world environment. The sensor system 522 can include various types of sensors, such as GPS sensors, inertial measurement units (IMU) or sensors, measurement sensors, image sensors (e.g., image capture devices for capturing images of physical objects in the real-world environment), or any other suitable sensor. The sensor system 522 may send the sensor data to the processing unit 526. The sensor data may be processed by the processing unit 526 to determine the position and orientation of the portable electronic device 208 in the real-world environment and/or relative to the physical objects in the real-world environment as further described below.

The GPS sensor of the sensor system 522 may be configured to provide information regarding the position or location (e.g., location coordinates) of the portable electronic device 208 in the real-world environment. The IMU of the sensor system 522 may sense position and orientation changes of the portable electronic device 208 based on inertial acceleration. For example, the IMU may detect a pitch and yaw of the portable electronic device 208 while the portable electronic device 208 is stationary or in motion. The IMU may include one or more accelerometers that generate acceleration sensor data. The one or more accelerometers may be used to measure static acceleration, such as the tilt of the portable electronic device 208 relative to gravity, as well as dynamic acceleration resulting from motion of the portable electronic device 208. The IMU may also include one or more gyroscopes configured to generate sensor data indicating a current location or orientation of the portable electronic device 208.

The image capture device or sensor of the sensor system 522 may be configured to capture image data of the real-world environment within its field of view. The image capture device may add geographical location data into metadata fields of the captured image data. The captured image data may be used to determine the location or position of the portable electronic device 208 relative to the physical objects in the real-world environment. The captured image data may also be displayed on the display device 530 of the portable electronic device 208. In some examples, the image capture device may be a camera including three-dimensional capabilities. As shown in FIG. 4B, the imaging capture device may be located at the rear or back of the portable electronic device 208.

The measurement sensor of the sensor system 522 may be configured to measure ranges and/or distances from the portable electronic device 208 to areas of interest of the physical object in the real-world environment. For example, the portable electronic device 208 may measure the distance from the portable electronic device 208 to an anomaly (e.g., damage, a defect, etc.) of a physical object (e.g., aircraft) in the real-world environment. In some examples, the measurement device may be configured to project a laser or light beam onto the physical object to illuminate an area of interest of the physical object. The measurement sensor may include a light emitting device, a laser device, an optical device, or any other suitable measurement sensor.

Referring still to FIG. 5, the storage device 524 of the portable electronic device 208 may store the physical or sensor data captured by the sensors of the sensor system 522. The storage device 524 may also store information relating to one or more physical objects. For example, the storage device 524 may include electronic or digital information (e.g., digital models, virtual representations, schematics, specifications, designs, installation diagrams, system information, etc.) about the physical objects. Further, the storage device 524 may store digital models and/or virtual representations of the physical objects. The digital models may include representations of structures, assemblies, systems, and subsystems of the physical object. In some examples, the storage device 524 may store a digital model representing a fuselage of an aircraft. The storage device 524 may also store mapping or positional data that represents a spatial or physical coordinate-based map of the physical objects in the real-world environment.

The storage device 524 of the portable electronic device 208 may also store program instructions that are executed or carried out by the processing unit 526 of the portable electronic device 208. The storage device 524 may include physical, non-transitory, computer-readable memory that stores data on a temporary or permanent basis for use by the processing unit 526. The memory may include one or more volatile and/or non-volatile memory devices, such as random access memory (RAM), static random access memory (SRAM), dynamic RAM (DRAM), read only memory (ROM), flash memory, or any other suitable medium or memory which may be used to store desired information (e.g., system information, virtual models, mapping information, etc.).

The processing unit 526 of the portable electronic device 208 may be in communication with the various components of the portable electronic device 208. The processing unit 526 may include one or more processors. For example, the processing unit 526 may include one or more central processing units (CPU), one or more graphical processing units (GPU), one or more digital signal processors (DSP), one or more peripheral interface controllers (PIC), or another type of microprocessors.

The processing unit 526 may be configured to identify and select a digital model of a physical object in the real-world environment. The processing unit 526 may retrieve the digital model of the physical object from the storage device 524 or a remote database, such as the database 212 of FIG. 3. In some examples, the processing unit 526 may select and/or retrieve a digital model representing a fuselage of an aircraft. In other examples, the processing unit 526 may retrieve, based on the physical object, a digital model representing a building, a vehicle, an industrial facility, a power plant, a ship, a spacecraft, a submarine, or any other suitable object.

The digital model may represent a 3-D model or representation of the physical object including the systems and structures of the physical object. In some examples, the digital model may be a computer-aided design (CAD) model and may use a coordinate system to identify positions of spatial or virtual content of the digital model of the physical object. The digital model may be based on the design, testing, manufacturing, installation, and/or operational phases of the physical object.

Once the processing unit 526 selects and retrieves the digital model of the physical object, a user may use the portable electronic device 208 to identify positions or locations of areas of interest of physical objects in the real-world environment. When the user is using the portable electronic device 208, the processing unit 526 may receive and collect physical or sensor data associated with the physical objects in the real-world environment 206 from the sensor system 522. For example, the processing unit 526 may capture image data about the physical objects in the real-world environment. Based on the sensor data, the processing unit 526 may be configured to determine the location of the portable electronic device 208 in the real-world environment and the locations or positions of the physical objects in the real-world environment. For example, the processing unit 526 may use GPS data to determine the location of the portable electronic device 208 in the real-world environment (e.g., geo-centric or aircraft centric (relative to the aircraft)) and may use image data to determine the position and orientation of the portable electronic device 208 in the real-world environment (e.g., geo-centric or aircraft centric (relative to the aircraft)). Further, the processing unit 526 may be configured to determine the distance of the portable electronic device 208 to the physical objects and/or items or markers on the physical object in the real-world environment. Additionally, the processing unit 526 may be configured to determine the location of the portable electronic device 208 relative to the physical objects and items or markers of the physical object.

The processing unit 526 may also be configured to map the sensor data of the real-world environment in a physical coordinate system or reference frame. For example, the processing unit 526 may generate mapping or positional data that represents a spatial or physical coordinate-based map of the real-world environment. The processing unit 526 may map the real-world environment to establish a relationship between a position or location of the portable electronic device 208 and the positions of the physical objects within the real-world environment 206 such that, upon mapping the real-world environment, the physical objects are assigned specific positional coordinates within the physical coordinate system. The physical coordinate system may be based on the position of the portable electronic device 208 within the real-world environment 206. In some examples, the physical coordinate system may be three-dimensional and include three mutually-perpendicular axes.

The processing unit 526 may also be configured to track the position and orientation of the portable electronic device 208 in the real-world environment. For example, the processing unit 526 may process the sensor or physical data received from the sensor system 522 to determine the position and orientation of the portable electronic device 208 relative to the physical objects in the real-world environment. As the portable electronic device 208 moves within the real-world environment (e.g., a fuselage of an aircraft), the processing unit 526 may be configured to track the physical objects in the real-world environment 206 for determining the position and orientation of the portable electronic device 208 relative to the physical objects and/or items or markers of the physical objects in the real-world environment. For example, the processing unit 526 may track changes in the proximity and angle of the portable electronic device 208 relative to the physical objects or items of the physical object in the real-world environment. In some examples, the items may include fiducial markers. Based on the perceived changes in the real-world environment surrounding the portable electronic device 208, the processing unit 526 may calculate movement (e.g., translation and/or rotation) of the portable electronic device 208 and determine a current position and orientation of the portable electronic device 208 relative to the physical objects in the real-world environment 206.

The processing unit 526 may be configured to align or spatially-register the physical object in the real-world environment 206 to a digital model or representation of the physical object. The processing unit 526 may use a transformation or transfer function to align the physical object defined in a physical coordinate system to digital or virtual content of a digital model of the physical object defined in a local or object coordinate system. Once the physical object in the real-world environment is aligned with the digital model of the object, the portable electronic device 208 may be configured to determine positions of areas of interest of a physical object in the object coordinate system.

Figure 6:
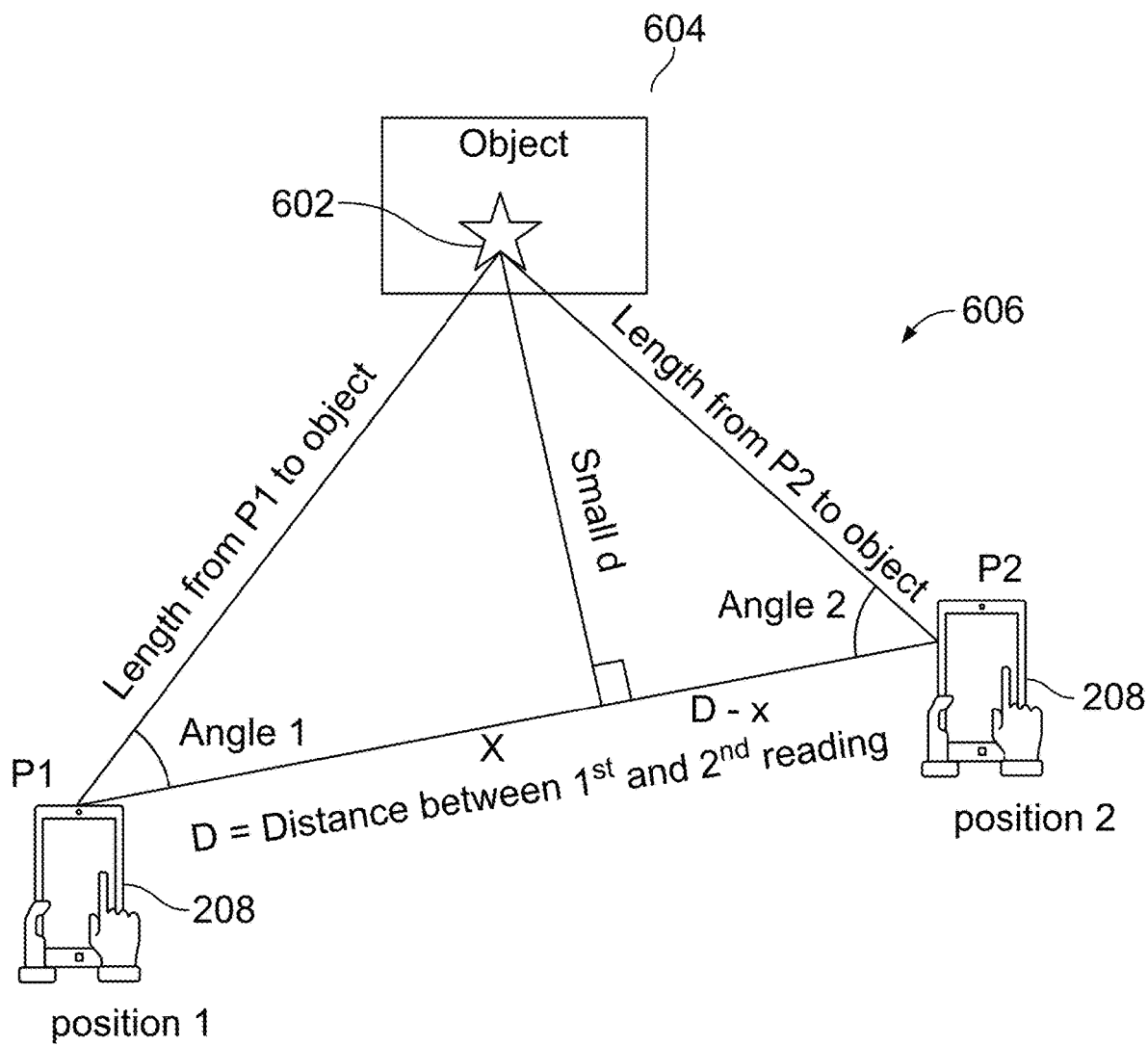
FIG. 6 is a schematic illustration of a technique to determine a location of an area of interest of a physical object.

As shown in FIG. 6, the portable electronic device 208 may use triangulation techniques to determine a position or location of an area of interest 602 of a physical object 604 in a real-world environment 606. In other embodiments, the portable electronic device 208 may use trilateration techniques, multilateration techniques, or any other suitable technique to determine the location of the area of interest 602 of the physical object 604 in the real-world environment. As shown in FIG. 6, the portable electronic device 208 can determine a first position (P1) of the portable electronic device at a first time. From the first position (P1), the portable electronic device 208 may determine a distance or length from the first position (P1) to the area of interest 602 of the physical object 604. At a second time, the portable electronic device 208 can determine a second position (P2) of the portable electronic device 208 and a distance or length from the second position (P2) to the area of interest 602 of the physical object 604.

After the portable electronic device 208 determines the location of the first and second positions, the portable electronic device 208 may calculate the distance (D) between the first position (P1) and the second position (P2). Based on these calculations, the portable electronic device 208 can calculate the location of the area of interest 602 of the physical object 604 based on the following expressions:

$$\tan(\text{angle 1}) = d/x \tag{1}$$

$$\tan(\text{angle 2}) = d/(D-x) \tag{2}$$

$$d = x * \tan(\text{angle 1}) \tag{3}$$

$$d = (D-x) * \tan(\text{Angle 2}) \tag{4}$$

-continued $$x*\tan(\text{angle 1}) = (D-x)*\tan(\text{angle 2}) \quad (5)$$

$$x*\tan(\text{angle 1}) = D*\tan(\text{angle 2}) - x*\tan(\text{angle 2}) \quad (6)$$

$$x*\tan(\text{angle 1}) + x*\tan(\text{angle 2}) - D*\tan(\text{angle 2}) \quad (7)$$

$$x*[\tan(\text{angle 1}) + \tan(\text{angle 2})] - D*\tan(\text{angle 2}) \quad (8)$$

$$x = D*\tan(\text{angle 2})/[\tan(\text{angle 1}) + \tan(\text{angle 2})] \quad (9)$$

Figure 7A:
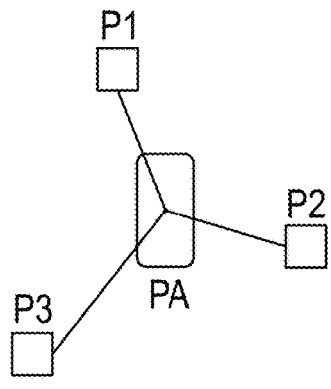
FIGS. 7A-7E illustrate another technique to determine a location of an area of interest of a physical object.
Figure 7B:
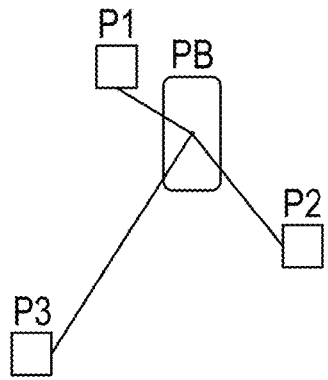
Figure 7C:
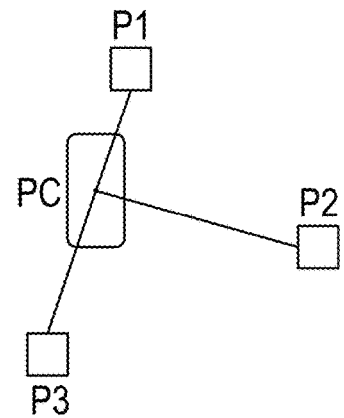

The portable electronic device 208 may use other techniques to determine a position or location of an area of interest 602 of a physical object 604 in a real-world environment 606. As shown in FIGS. 7A-7E, the portable electronic device may determine the position or location of the electronic device using trilateration of the portable electronic device relative to three (3) known locations of the object. Initially, the portable electronic device may be geolocated at three (3) positions relative to three (3) known and/or fixed features or items (P1, P2 and P3) of the object as shown in FIGS. 7A-7C. For example, for an aircraft, the portable electronic device may determine the location of the portable electronic device within the aircraft based on three known and fixed items, such as an RFID chip, a QR code at a known reference point, and a door hinge, within the aircraft. The portable electronic device may determine a first location or position (PA) of the portable electronic device relative to the three known items (P1, P2, and P3) at a first time as shown in FIG. 7A. The portable electronic device may also determine a second location (PB) of the portable electronic device relative to the three known items (P1, P2, and P3) at a second time as shown in FIG. 7B. Further, the portable electronic device may determine a third location (PC) of the portable electronic device relative to the three known items (P1, P2, and P3) at a third time as shown in FIG. 7C.

Figure 7D:
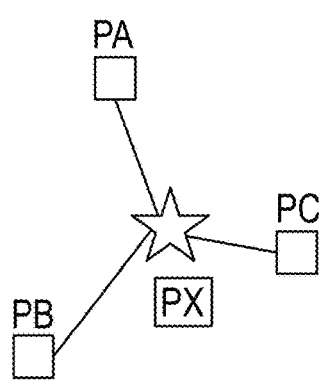
Figure 7E:
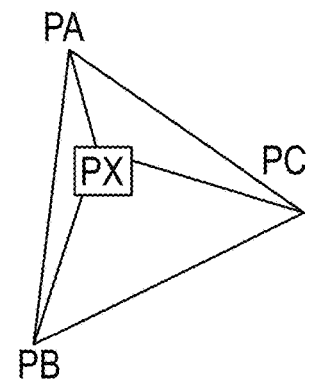

After the portable electronic device determines the three locations of the portable electronic device relative to the three known items, the portable electronic device may determine a position or location of an area of interest of a physical object in a real-world based on the first position (PA), the second position (PB), and the third position (PC) of the portable electronic device as shown in FIG. 7D. The portable electronic device may calculate a distance from the first position (PA) area to the area of interest (PX), calculate a distance from the second position (PB) to the area of interest (PX), and calculate the distance from the third position (PC) to the area of interest (PX). Based on these calculations, the portable electronic device 208 can calculate the location of the area of interest (PX) (e.g., an area of interest of the object) in three dimensions as shown in FIG. 7D-7E based at least on the following expressions:

$$(D_z - A_z)^2 + (D_y - A_y)^2 - |AD|^2 = 0 \quad (10)$$

$$(D_z - B_z)^2 + (D_y - B_y)^2 - |BD|^2 = 0 \quad (11)$$

$$(D_z - C_z)^2 + (D_y - C_y)^2 - |CD|^2 = 0 \quad (12)$$

$$D_z = (((-A_x)^2 + (B_x)^2 - (A_y)^2 + (B_y)^2 - |BD|^2 + |AD|^2)/2) - (D_y(B_y - A_y))/(B_x - A_x) \quad (13)$$

where $A(A_z, A_y)$ is the location of PA, where $B(B_z, B_y)$ is the location of PB, where $C(C_z, C_y)$ is the location of PC, where $D(D_z, D_y)$ is the location of PX, and where the distances |AD|, |BD|, |CD| are known.

Referring again to FIG. 6, the portable electronic device 208 may utilize any suitable coordinate system for determining the position of the portable electronic device 208 within the real-world environment and/or the position of the area of interest 602 of the physical object 604. For example, the portable electronic device 208 may use a Geodetic Coordinate System in which a location on the Earth is specified by longitude (e.g., in degrees East or West of the Prime Meridian) and latitude (e.g., degrees North or South from the Equator), and altitude is specified by height above Mean Sea Level (MSL). This coordinate system provides spherical coordinates (e.g., approximating the shape of the Earth).

The portable electronic device 208 may also use a local coordinate system of East, North, and Up (ENU). In this coordinate system, the location is specified by units East and North of the coordinate system origin (e.g., located on the Earth by a geodetic pair), and altitude is specified by height above Mean Sea Level (MSL). Further, the portable electronic device 208 may use a local coordinate system of North, East, and Down (NED). This coordinate system is similar to the ENU system wherein the x component is the same as the ENU East component, the y component is the same as the ENU Up component, and the z component is the negative of the ENU North component. The NED coordinate system is similar to the earth-centered-earth fixed (ECEF) coordinate system. The relationship between the NED coordinate system and the ECEF coordinate system is given by the following expression:

$$P_{NED} = R^T(P_{ECEF} - P_{Ref})$$

where $P_{NED}$ is a 3D position in a NED system, $P_{ECEF}$ is the corresponding ECEF position, $P_{Ref}$ is the reference ECEF position (where the local tangent plane originates), and where R is a rotation matrix with columns in the north, east, and down axes and may be defined from the latitude phi and longitude lambda corresponding to $P_{Ref}$ as follows:

$$R = \begin{bmatrix} -\sin(\phi)\cos(\lambda) & -\sin(\phi)\sin(\lambda) & \cos(\phi) \\ -\sin(\lambda) & \cos(\lambda) & 0 \\ -\cos(\phi)\cos(\lambda) & -\cos(\phi)\sin(\lambda) & -\sin(\phi) \end{bmatrix}$$

In some implementations, the portable electronic device 208 may use GPS location information to determine the location of the area of interest 602 of the physical object 604 (e.g., aircraft) in the real-world environment (e.g., geocentric or object/aircraft centric (relative to the object/aircraft)). For example, the portable electronic device 208 may determine a GPS location of the area of interest 602 and GPS locations of known fixed items or markers of the physical object 604 (e.g., aircraft). The portable electronic device 208 may then calculate an object-centric location (e.g., aircraft-centric location) of the area of interest 602 relative to the known fixed items or markers of the object (e.g., aircraft). The portable electronic device 208 may also use GPS location information to determine the location of the portable electronic device 208 in the real-world environment (e.g., geo-centric or object centric (relative to the object)).

Referring again to FIG. 5, once the processing unit 526 of the portable electronic device 208 determines a location of an area of interest of a physical object in the real-world environment defined in a physical coordinate system, the processing unit 526 may be configured to determine a location of the area of interest of the physical object in coordinates of the coordinate system of the physical object. The processing unit 526 may use a transformation or transfer function to transform or convert the coordinates of the location of the area of interest of the physical object in the real-world environment into coordinates of the coordinate system of the physical object. In some examples, the coordinates of the coordinate system of the physical object may be three-dimensional coordinates defined along three mutually perpendicular axes within the coordinate system of the object.

Once the coordinates of the area of interest of the physical object are determined in the coordinate system of the object, the processing unit 526 may retrieve electronic or digital information about the area of interest of the physical object from the storage device 524 or a database. The processing unit 526 may be configured to search electronic or digital records and reports (e.g., damage report records, service requests, etc.) in one or more databases for information relating to the areas of interest of the physical object. For example, the processing unit 526 may search electronic reports and records for problems related to the location of the damage for a particular type of vehicle or aircraft. The processing unit 526 may identify and cause the relevant electronic or digital records to be displayed to support or maintenance personnel. For example, the processing unit 526 may be configured to cause the electronic or digital information (e.g., graphic or virtual representations of the area of interest) to be displayed on the display device 530 of the portable electronic device 208. Further, the processing unit 526 may send the electronic or digital information to other communication or computing devices to enable remote personnel to analyze the area of interest of the physical object. Additionally, the processing unit 526 may also store or log any current damage reports of the physical object in a database as a new record or report. For example, the processing unit 526 may create and store a service request or problem report, including the description and type of damage, object or vehicle type, photos and sketches of the damage, etc., in a database (e.g., airline database) based on the physical location of the damage.

Referring still to FIG. 5, the user interface 528 of the portable electronic device 208 may allow a user or maintenance personnel to interact with the portable electronic device 208. The user interface 528 may include an interactive touchscreen. In other examples, the user interface 528 may include a keyboard, a mouse, microphones, or any other suitable input/output device. The user interface 528 of the portable electronic device 208 may be configured to receive inputs and/or user selections to enable the portable electronic device 208 to select one or more digital models representative of a physical object. For example, a user may input into the user interface 528 information relating to a physical object in the real-world environment (e.g., an aircraft), a system of the physical object (e.g., an electrical wiring system of an aircraft), a component of a system and/or other information related to the physical object. After the information is received, the portable electronic device 208 may display graphical or virtual content on the user interface 528 or the display device 530 related to the area of interest of the physical object as further described below.

The display device 530 of the portable electronic device 208 may be configured to present visual, audio, and/or tactile information to the user or maintenance personnel. The display device 530 may include a screen or any another suitable type of display. In other examples, the display device 530 may be integrated into a transparent or translucent visor of an optical see-through augmented reality (AR) imaging device and viewable by a user or technician wearing the AR imaging device.

The display device 530 of the portable electronic device 208 may be configured to display a live view of the real-world environment such that a user is able to view a representation of physical objects in the real-world environment in real time. In some examples, the display device 530 may display a representation of a fuselage of an aircraft (or a portion thereof). The display device 530 may also display augmented-reality (AR) content, such as graphical or virtual content. The display device 530 of the portable electronic device 208 may also be configured to display graphical or virtual representations of the area of interest of the physical object and/or images of the areas of interest as shown in FIG. 4A.

Figure 8:
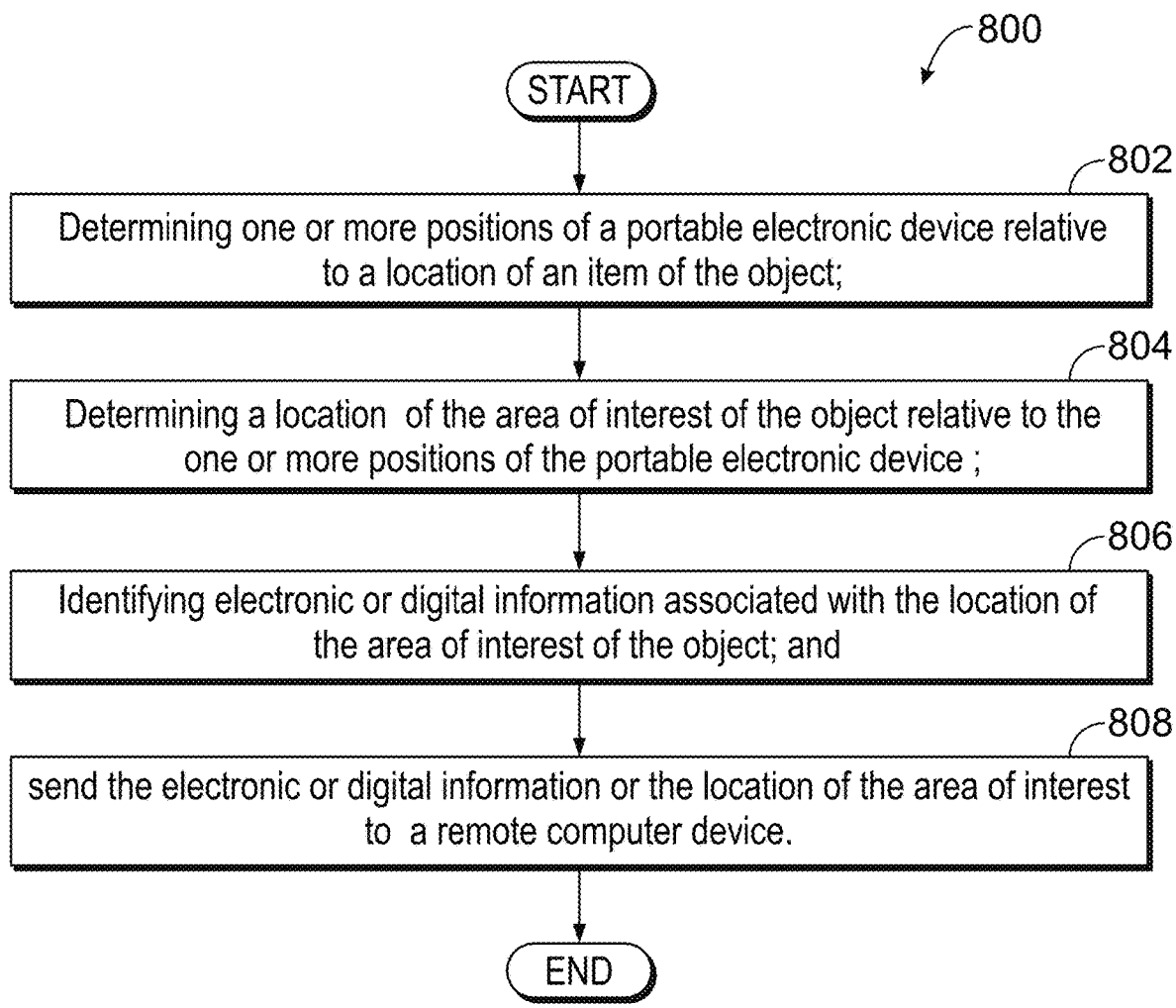
FIG. 8 is an exemplary flow diagram illustrating a method for obtaining information related to an area of interest of a physical object.

FIG. 8 illustrates a flow diagram of a method 800 of obtaining electronic or digital information (e.g., 3D digital models, virtual representations, schematics, drawings, etc.) related to an area of interest of a physical object (e.g., an aircraft) in a real-world environment, according to an exemplary embodiment. The method may be performed or implemented entirely, or in part, by a portable electronic device or AR device, such as the portable electronic device 208 of FIG. 3.

The portable electronic device may identify and capture data of physical objects in a real-world environment. The physical objects may be vehicles, aircrafts, buildings, industrial facilities, power plants, ships, spacecraft, submarines, or any other physical object. The portable electronic device may be configured to retrieve a digital model of the physical object from memory or a database. The digital model may be a computer-aided design (CAD) model. The digital model of the physical object may include structures and systems of the physical object. In some examples, the digital model may represent one or more systems of an aircraft. For example, the systems may include hydraulic systems, air trim systems, environmental systems, flight management systems, navigation systems, communications systems, sensor systems, propulsion systems, flight control systems, electrical systems, pneumatic systems, guidance systems, radar systems, air-conditioning systems, blower systems, air intake systems, and/or any other electronic, mechanical, and/or hardware system of an aircraft.

The digital model may be stored in a storage device (e.g., a database) of the portable electronic device. In some examples, the digital model may be generated and stored at a remote or separate database (e.g., the database 212 of FIG. 3) and the portable electronic device may access and/or retrieve the digital model from the remote or separate database. The digital model may be constructed or generated during the design, testing, manufacturing, installation, and/or operational phase of the physical object. The portable electronic device may be configured to align or spatially register the digital model of the physical object with the corresponding physical object in the real-world environment. For example, the portable electronic device may use a transformation or transfer function to align the digital model defined as a coordinate system of the object with the physical object in the real-world environment defined in a physical coordinate system. For example, the portable electronic device may transform or convert the coordinates of the physical object in the real-world environment into positional coordinates in a coordinate system of the object.

At block 802, the method 800 involves determining one or more positions of a portable electronic device relative to a location of one or more items of the object. Once the digital model of the object is aligned with the physical object in the real-world environment, the portable electronic device may receive and/or capture physical or sensor data associated with the physical object in the real-world environment. For example, the portable electronic device may receive sensor data (e.g., GPS data, image data, etc.) about the physical object in the real-world environment. In the example illustrated in FIG. 3, the portable electronic device may capture image data about a fuselage of an aircraft.

The portable electronic device may determine, based on the sensor data, the position of the portable electronic device in the real-world environment and/or relative to the physical object. The portable electronic device may be configured to map the sensor data of the physical object in a physical coordinate system or reference frame. For example, the portable electronic device may generate mapping or positional data that represents a spatial or physical coordinate-based map of the physical object in the real-world environment. The portable electronic device may map the physical environment to establish a relationship between positions of the portable electronic device and the positions of the physical object in the real-world environment such that, upon mapping the physical object in the real-world environment, the physical object may be assigned specific positional coordinates within the physical coordinate system. The physical coordinate system may be based on the position of the portable electronic device within the real-world environment.

The portable electronic device may also be configured to track the position and orientation of the portable electronic device relative to the physical object in the real-world environment. The portable electronic device may process sensor or physical data to determine the position and orientation of the portable electronic device relative in the real-world environment and/or relative to the physical object. As the portable electronic device moves within the real-world environment (e.g., within a fuselage of an aircraft), the portable electronic device may track the physical object in the real-world environment for determining the position and orientation of the portable electronic device in the physical environment relative to the physical object. For example, the portable electronic device may track changes in the proximity and angle of the portable electronic device relative to the physical object in the real-world environment or items or markers of the physical object. In some examples, the physical object may include fiducial markers. Based on the perceived changes in the real-world environment surrounding the portable electronic device, the portable electronic device may calculate movement (e.g., translation and/or rotation) of the portable electronic device and determine a current position and orientation of the portable electronic device relative to the physical object.

After the portable electronic device determines the location of the portable electronic device relative to the physical object, the portable electronic device may measure, using a measurement device, a distance or range from the portable electronic device to the area of interest (e.g., an anomaly, a defect, a fault, a component, a part and/or a condition) of the physical object. The portable electronic device may measure the distance, at one or more times or positions, from the portable electronic device to the area of interest of the physical object.

At block 804, the method 800 involves determining a location of the area of interest of the object relative to the one or more positions of the portable electronic device. After the portable electronic device determines the range/distance to the areas of interest of the physical object, the portable electronic device may determine a position of the area of interest of the physical object in the real-world environment defined in a physical coordinate system. The portable electronic device may use a transformation or transfer function to transform or convert a coordinates of the position of the area of interest of the physical object in the real-world environment into coordinates of a coordinate system of the object. The coordinates of the coordinate system of the object may be three-dimensional coordinates defined along three mutually perpendicular axes within the coordinate system of the object.

At block 806, the method 800 involves identifying electronic or digital information associated with the location of the area of interest of the object. After the location of the area of interest of the physical object is determined in the coordinate system of the object, the portable electronic device may identify and retrieve electronic or digital information (e.g., digital models, virtual representations, schematics, maintenance reports, specifications, designs, installation diagrams, digital twins, etc.) associated with or related to the area of interest of the physical object. The portable electronic device 208 may retrieve the electronic or digital information from a remote database and/or the memory of the portable electronic device. In some examples, the portable electronic device 208 may retrieve a 3-D digital model of the physical object (e.g., a digital model of an aircraft) or a 3-D model that corresponds to the area of interest of physical object (e.g., a digital model of a structure, system or component of an aircraft).

At block 808, the method 800 involves sending the electronic or digital information or the location of the area of interest to a remote computing device. Once the electronic or digital information is retrieved from memory or a database, the portable electronic device may send the electronic or digital information to other communication or computing devices. In some examples, the portable electronic device may send the location of the area of interest of the physical object in the coordinate system of the object to other communication devices. The communication devices may use the location of the area of interest 202 to access the electronic or digital information from a remote database or local memory.

By utilizing the portable electronic device of the present application, maintenance personnel and technicians can efficiently troubleshoot complex physical objects, such as vehicles, machines, or structures. Further, the time required to troubleshoot an anomaly of a physical object within a real-world environment may be substantially diminished. For the airline industry, the system disclosed herein can reduce the number of flights that are delayed or cancelled for repairs and maintenance.

Although the disclosed systems have been generally described and illustrated in conjunction with an aircraft, the systems can be used to locate a defect or fault of any physical object, such as the complex systems created by the automotive, marine, electronics, power generation and computer industries. As such, the foregoing description of the utilization of the disclosed systems and methods in an aircraft was for purposes of illustration and example and not of limitation since the systems and methods described above are equally applicable in many different industries.

Further, the description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

The embodiments described herein can be realized in hardware, software, or a combination of hardware and software. For example, the embodiments can be realized in a centralized fashion in at least one computer system or in a distributed fashion where different elements are spread across interconnected computer systems. Any kind of computer system or other apparatus adapted for carrying out the methods described herein can be employed. Further, the embodiments described herein can be embedded in a computer program product, which includes all the features enabling the implementation of the operations described herein and which, when loaded in a computer system, can carry out these operations.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While apparatus has been described with reference to certain examples, it will be understood by those skilled in the art that various changes can be made and equivalents can be substituted without departing from the scope of the claims. Therefore, it is intended that the present apparatus not be limited to the particular examples disclosed, but that the disclosed apparatus include all embodiments falling within the scope of the appended claims.

What is claimed is:

1. A portable electronic device for obtaining information about an area of interest of an object comprising:
    a display;
    an image capture device;
    a measurement device configured to measure distances or angles to spatial points; and
    a processor configured to:
        determine one or more positions of the portable electronic device relative to a location of one or more items of the object;
        determine a location of the area of interest of the object relative to the one or more positions of the portable electronic device;
        identify electronic or digital information associated with the location of the area of interest of the object; and
        send the electronic or digital information or the location of the area of interest to a remote computing device.

2. The portable electronic device of claim 1, wherein the location of the area of interest of the object comprises three-dimensional coordinates.

3. The portable electronic device of claim 1, wherein the one or more items of the object are located at a fixed and known location, wherein the area of interest of the object corresponds to an anomaly, damage, a crack, a condition, a defect, an item, a part, a component, an article, a feature, a point, or a portion of the object, and wherein the object comprises a vehicle, an aircraft, a ship, a building, a spacecraft, or a submarine.

4. The portable electronic device of claim 1, wherein each of the one or more items comprise a marker, an article, a feature, or an object, and wherein the one or more positions of the portable electronic device are defined in a physical coordinate system.

5. The portable electronic device of claim 1, wherein the processor is further configured to align or correlate the object to a digital model of the object.

6. The portable electronic device of claim 1, wherein the location of the area of interest of the object is defined in a physical coordinate system.

7. The portable electronic device of claim 6, wherein the location of the area of interest of the object corresponds to a three-dimensional location of the area of interest of the object in a coordinate system of the object.

8. The portable electronic device of claim 6, wherein the processor is further configured to convert, using a transfer function, the location of the area of interest of the object to coordinates in a coordinate system of the object.

9. The portable electronic device of claim 6, wherein the location of the area of interest of the object in the physical coordinate system is determined using triangulation, trilateration, or multilateration techniques.

10. The portable electronic device of claim 1, wherein determining the one or more positions of the portable electronic device further comprises:
   determining a first position of the portable electronic device relative to the location of the one or more items of the object;
   determining a second position of the portable electronic device relative to the location of the one or more items of the object; and
   determine a third position of the portable electronic device relative to the location of the one or more items of the object.

11. The portable electronic device of claim 10, wherein the processor is further configured to:
   determining a distance between the first position of the portable electronic device and the area of interest of the object;
   determining a distance between the second position the portable electronic device and the area of interest of the object; and
   determining a distance between the third position of the portable electronic device and the area of interest of the object.

12. The portable electronic device of claim 1, wherein the measurement device includes a light emitting device, a laser device, or an optical device.

13. The portable electronic device of claim 1, wherein the display is configured to display a virtual or digital representation of the area of interest of the object based on the electronic or digital information.

14. The portable electronic device of claim 1, wherein the electronic or digital information includes digital pictures, technical documentation, schematics, maintenance reports, system data, photographic records, silhouette imagery, or combinations thereof.

15. The portable electronic device of claim 1, wherein the processor is further configured to retrieve the electronic or digital information from memory or a database.

16. The portable electronic device of claim 1, wherein the portable electronic device comprises an augmented reality device having a head-mounted device configured to be worn by a user.

17. A method for obtaining information about an area of interest of an object comprising:
   determining, by one or more processors, one or more positions of a portable electronic device relative to a location of one or more items of the object;
   determining, by the one or more processors, a location of the area of interest of the object relative to the one or more positions of the portable electronic device;
   identifying, by the one or more processors, electronic or digital information associated with the location of the area of interest of the object; and
   sending the electronic or digital information or the location of the area of interest to a remote computing device.

18. The method of claim 17, wherein the location of the area of interest of the object is defined in a physical coordinate system, and further comprising:
   converting, using a transfer function, the location of the area of interest of the object to coordinates in a coordinate system of the object.

19. The method of claim 18, wherein the object comprises a vehicle, an aircraft, a ship, a building, a spacecraft, or a submarine, wherein the one or more items of the object are located at a fixed and known location, and wherein the location of the area of interest of the object in the physical coordinate system is determined using triangulation, trilateration, or multilateration techniques.

20. A non-transitory computer-readable medium storing instructions that, when the instructions are executed by one or more processors, cause the one or more processors to perform operations for obtaining information about an area of interest of an object comprising:
   determining one or more positions of a portable electronic device relative to a location of one or more items of the object;
   determining a location of the area of interest of the object relative to the one or more positions of the portable electronic device;
   identifying electronic or digital information associated with the location of the area of interest of the object; and
   sending the electronic or digital information or the location of the area of interest to a remote computing device.

* * * * *